United States Patent [19]

Woo et al.

[11] Patent Number: 4,856,259
[45] Date of Patent: Aug. 15, 1989

[54] APPARATUS FOR SEALING AND SEVERING A WEB OF FILM

[75] Inventors: Lecon Woo, Libertyville; Michael T. K. Ling, Vernon Hills, both of Ill.

[73] Assignee: Baxter International Inc., Deerfield, Ill.

[21] Appl. No.: 258,945

[22] Filed: Oct. 17, 1988

[51] Int. Cl.⁴ .................... B65B 51/30; B65B 51/14
[52] U.S. Cl. .................... 53/373; 156/583.1; 156/583.2
[58] Field of Search ............ 53/552, 551, 373; 156/583.1, 583.2; 219/241, 251, 516

[56] References Cited

U.S. PATENT DOCUMENTS

| | | |
|---|---|---|
| 2,941,575 | 6/1960 | Malmberg et al. |
| 3,574,039 | 4/1971 | Fehr et al. |
| 3,593,000 | 7/1971 | Forma |
| 3,874,976 | 4/1975 | MacFarland, Jr. |
| 3,965,653 | 6/1976 | Lerner ............... 53/373 X |
| 3,982,091 | 9/1976 | Hamm et al. |
| 4,288,968 | 9/1981 | Seko et al. ............ 53/552 X |
| 4,330,355 | 5/1982 | Bopst ............ 156/583.1 X |
| 4,455,808 | 6/1984 | Netzhammer ............ 53/373 |
| 4,582,555 | 4/1986 | Bower ............ 156/583.1 X |
| 4,630,429 | 12/1986 | Christine ............ 53/373 X |
| 4,761,197 | 8/1988 | Christine et al. |

FOREIGN PATENT DOCUMENTS 2025177  9/1970  France.

Primary Examiner—Horace M. Culver
Attorney, Agent, or Firm—Paul E. Schaafsma; Robert M. Barrett; Paul C. Flattery

[57] ABSTRACT

An apparatus for sealing and severing a web of film is provided. The apparatus includes a sealing bar having a body portion including first and second sidewalls and a top portion for melting and severing a portion of a web of film. A backup member is provided located on an opposite side of the film from the sealing bar for urging the film against a portion of the sealing bar. The apparatus also includes a holder for holding the sealing bar, the holder includes a first side and a second side that define a center region for receiving at least a portion of the body of the sealing bar, and first and second sides having shoulders. The shoulders and top portion of the sealing bar are so constructed and arranged that they deflect a bead generated at a molten area of the film when the film is sealed and severed and substantially limit the creation of a resultant bead in a final cooled product.

46 Claims, 2 Drawing Sheets

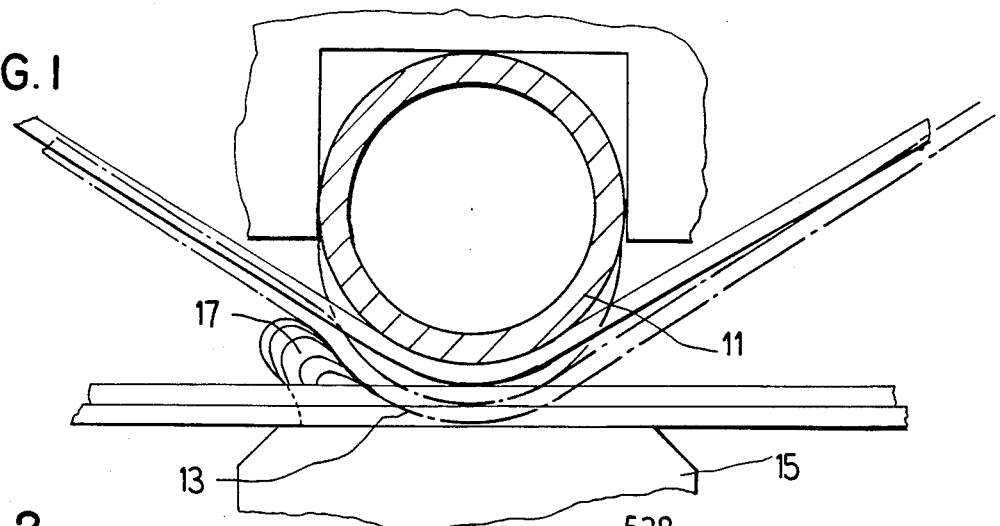
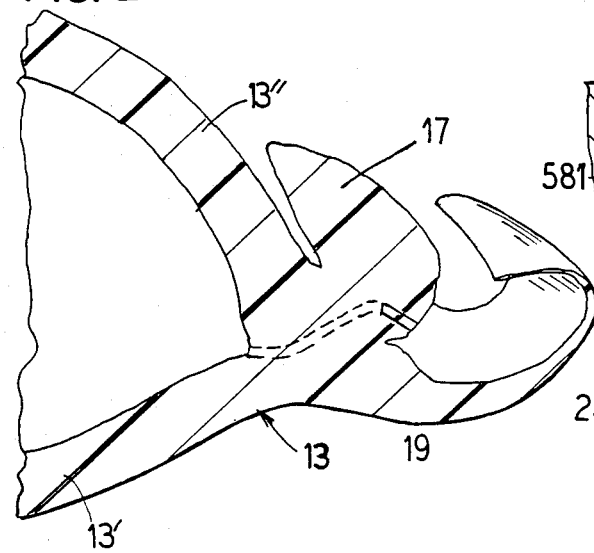
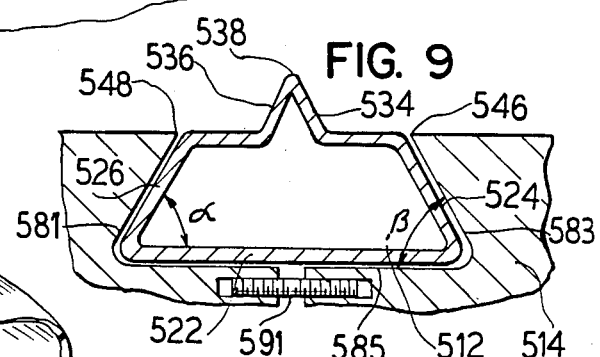
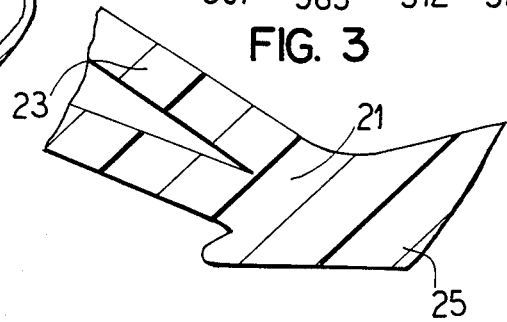
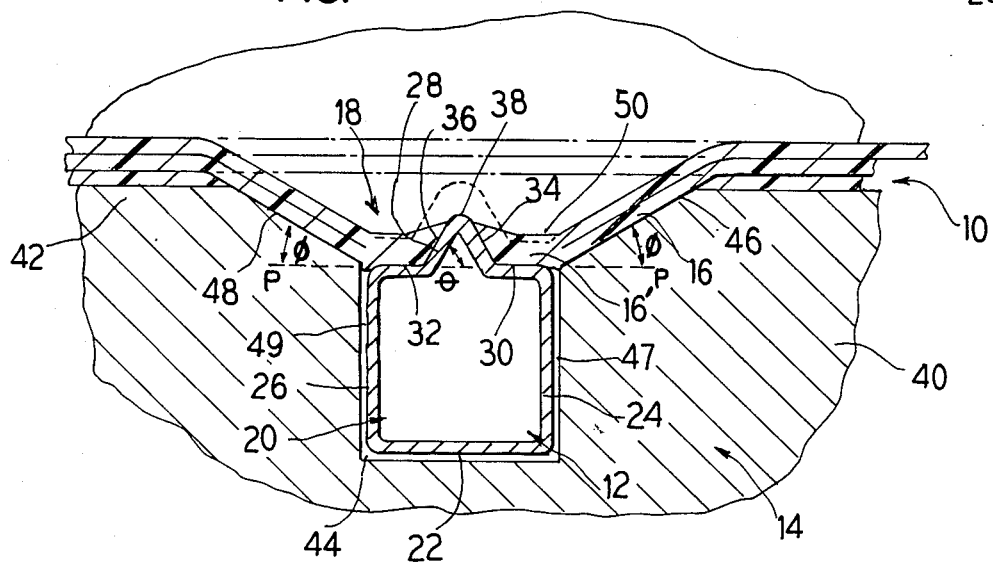

APPARATUS FOR SEALING AND SEVERING A WEB OF FILM

BACKGROUND OF THE INVENTION

The present invention relates generally to an apparatus for sealing and severing a web of film. More specifically, the present invention relates to an apparatus for creating side seals in a web of film in a form, fill, seal packaging machine and for severing a web of film between the side seals.

Typically, form, fill, seal packaging machines are utilized to package a product in a flexible container. To this end, form, fill, seal packaging machines are used to seal pharmaceuticals, dairy products, wine, food stuffs, cosmetics, and other products in flexible containers. The form, fill seal packaging machine provides an apparatus for packaging these products in an expedient manner.

In one type of form fill, seal packaging machine a web of heat-sealable film is passed over a former or mandrel that forms the film into a tubular shape. To effect the tubular shape, the film is folded longitudinally and heat sealed along abutting longitudinal edges. The tubular shaped film is then passed around a tubular fill system that deposits the product to be packaged into the tubular shaped film. To create individual packages (hereinafter "bags") the web of film must be sealed across its width to form side seals. These side seals are usually created by a sealer that creates the second seal for one bag while making the first seal for the next bag. Typically, after the side seals are created, the web of film can then be severed between the seals to create individual bags.

There are a variety of different methods for creating side seals in a web of film. One method is to utilize a sealing bar. In a typical form, fill, seal packaging machine, the sealing bar is secured to a set of jaws that are hydraulically actuated to grip the web of film. As the jaws grip the web of film, the sealing bar is urged against the web of film melting a portion of the web of film onto itself. Typically, after the sealing bar has melted the web of film, a knife is actuated and severs the web of film between the seals to create a flexible bag.

It is also known, to create the side seals in the web of film and sever the web of film contemporaneously. For example, U.S. Pat. Application Ser. No. 889,714 to Christine discloses an apparatus and method for contemporaneously creating side seals and serving the web of film.

One of the disadvantages with some of the prior apparatus and methods for creating side seals and severing the web of film is that the process and apparatus generates a large bead of material at the molten film area where the side seal is created and accordingly a resultant bead of material is created in the final product. This resultant bead is undesirable for many reasons. The bead can cause a resultant bag to have side seals that have inconsistent and reduced strength and therefore can break and/or leak. This is especially undesirable in the pharmaceutical industry wherein parenteral and enteral pouches typically are required to withstand a 6 foot drop test.

Furthermore, a bead is undesirable in that it can generate particulate material and matter. Again, this is especially undesirable in the pharmaceutical industry wherein even a limited amount of particulate matter in the fluid being housed in the bag can cause the product to be rejected. Moreover, the resultant bead can produce an aesthetically unpleasing final product.

Accordingly, there is a need for an improved apparatus for sealing and severing a web of film in a form, fill, seal packaging machine.

SUMMARY OF THE INVENTION

The present invention provides an improved apparatus for sealing and severing a web of film in a form, fill, seal packaging machine. The apparatus includes a sealing bar having a body portion including first and second sidewalls and a top portion for melting and severing a portion of the web of film. A backup member, located on an opposite side of the film from the sealing bar and diametric thereto, is provided for urging the film against a portion of the sealing bar.

A holder is provided for holding the sealing bar. The holder includes a first side and a second side that define a center region for receiving at least a portion of the body of the sealing bar. Located between the sides of the holder and sealing bar are insulating walls. The first and second sides of the holder each include shoulders. The shoulders and the top portion of the sealing bar are so constructed and arranged that they define means for deflecting a bead generated at a molten area of the film when the film is sealed and severed and thereby substantially limit the creation of a resultant bead in a final cooled product.

Preferably, at least a part of the top portion of the sealing bar has a triangular cross-sectional shape.

In an embodiment of the present invention, the outer surfaces of the shoulder of the holder member and the top portion of the sealing bar define, in cross-section, a W-shape.

In an embodiment of the present invention, the top portion of the sealing bar includes first and second sides. In the embodiment, the first and second sides extend upwardly from the body portion of the sealing bar at acute included angles with the respect to a plane that is parallel to an origin plane of the film. The first and second sides defined at an apex of the top portion cutting means for severing the film.

In a further embodiment, the top portion further includes plateau regions located between each side and the sidewall, the plateau regions extend in a plane substantially parallel to the origin plane with the film.

In another embodiment of the present invention, the shoulders of the holder extend upwardly from the center of the holder at an acute included angle with respect to a plane that is parallel to the origin plane of the film.

In another embodiment of the present invention, the side walls of the sealing bar extend from a base of the sealing bar at an angle of less than 90°. The corresponding sidewalls of the holder extend upwardly from a floor of the holder similarly, securing the sealing bar in the holder.

In another embodiment of the present invention, the shoulders define plateau regions lying in a plane substantially equal to a plane defined by the plateau regions of the sealing bar.

Preferably, the backup member includes resilient means for contacting a side of the web of film.

Accordingly, it is an advantage to the present invention to provide an apparatus for sealing and severing a web of film in a form, fill, seal packaging machine.

A further advantage of the present invention is to provide an apparatus that seals and severs a web of film in the same step of the process.

Furthermore, an advantage of the present invention is to provide an apparatus that creates side seals in a web of film and severs the web of film but limits the generation of a bead at the seal.

Moreover, an advantage of the present invention is to provide an apparatus for sealing and severing a web of film that provides an improved side seal for a resultant bag.

Still, an advantage of the present invention is to provide an apparatus for severing and sealing a web of film that allows one to control the geometry of the resultant seal.

A still further advantage of the present invention is that it provides an apparatus for sealing and severing a web of film that affords a clean cut-off free of fibrous defects.

Further, an advantage of the present invention is that it provides an apparatus for sealing and severing a web of film for use in a high productivity form, fill, seal packaging machine.

Moreover, an advantage of the present invention is that it provides an apparatus for sealing and severing a web of film that allows total geometric control of the seal shape and contour for maximum strength.

Another advantage of the present invention is that the sealing bar and holder cooperate to prevent the sealing bar from bowing outwardly even when heated to a high temperature.

Additional features and advantages are described in, and will be apparent from, the detailed description of the presently preferred embodiment and from the drawings.

BRIEF DESCRIPTION OF THE DRAWINGS

FIG. 1 illustrates a cross-sectional perspective view of an apparatus for sealing a web of film that results in the generation of a bead at the seal area.

FIG. 2 illustrates a cross-sectional enlarged view of the seal area of a web of film sealed with the apparatus illustrated in FIG. 1.

FIG. 3 illustrates a cross-sectional enlarged view of the seal area of a web of film sealed by the apparatus of the present invention.

FIG. 4 illustrates a cross-sectional perspective view of an embodiment of the apparatus for sealing and severing a web of film of the present invention.

FIG. 9 illustrates a cross-sectional perspective view of another embodiment of the apparatus for sealing and severing of the present invention.

DETAILED DESCRIPTION OF THE PRESENTLY PREFERRED EMBODIMENTS

Figure 5:
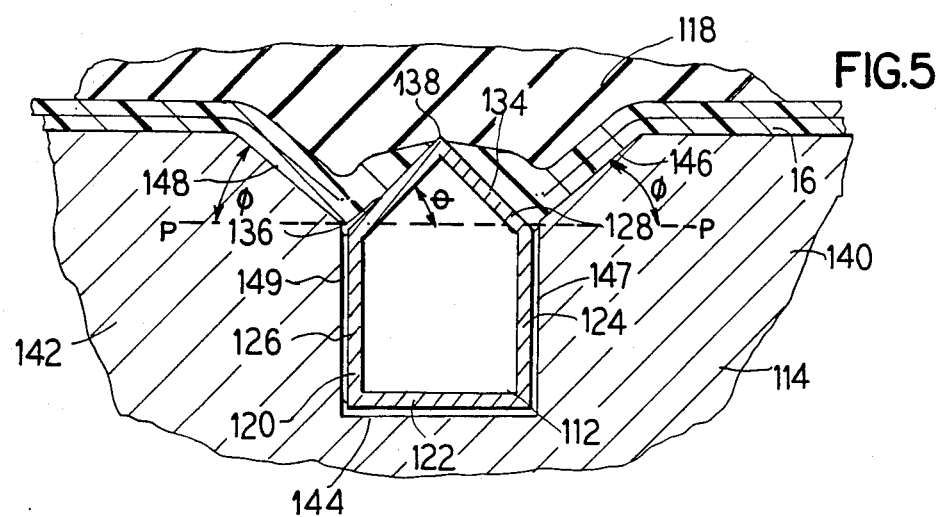
FIG. 5 illustrates a cross-sectional perspective view of another embodiment of the apparatus for sealing and severing a web of film of the present invention.

The present invention provides an apparatus for sealing and severing a web of film, preferably for use in a form, fill, seal packaging machine. As used herein, the term "form, fill, seal packaging machine" means a packaging machine for creating from a web of film a bag or pouch filled with a product. In a typical form, fill, seal packaging machine the web of film is folded along abutting longitudinal edges and sealed onto itself. The film is then filled with a product and side seals are created. The web of film is then severed between the side seals to create individual bags. Of course, the sealing and severing apparatus of the present invention can be used on other packaging machines or with other apparatus to seal and sever a web of film.

As stated above, the present invention relates to an apparatus for creating side seals in a web of film through the use of heat seals. The term "heat seal" refers to an interfacial molecular mixing of the film to achieve a tensile and shear strength approaching that of the base film.

FIG. 1 illustrates a prior method for sealing a web of film that resulted in the generation of a bead in the molten area. As illustrated, the heater member 11 seals the web of film 13 as the web of film is urged against the heater member by the backup member 15. However, due to the construction of the heater member 11, the backup member 15 does not create a constant pressure across the face of the surface of the heater member 11. This results in the generation of a bead 17 in an area where the molten plastic is not pressurized.

FIG. 2 illustrates an enlarged cross-sectional view of a resultant seal 19 between the two layers 13' and 13" of the web of film 13. As illustrated, a bead 17 is produced by the apparatus illustrated in FIG. 1 at the seal 19. Due to this bead area 17, the failure rate of the resultant product is increased. The increase in failure rate is due to the fact that there is not a sufficient interfacial mixing of the film 13 at this area and accordingly there is not a strong heat seal. Indeed, the dotted lines in FIG. 2 define therebetween an area where there is no interfacial mixing of the film 13; the only interfacial mixing occurs in the limited area defined between the solid lines, to the right of the dotted lines in FIG. 2.

As set forth in detail below, the present invention overcomes the deficiency of the prior apparatus by affording a construction of the sealing bar and its holder that allows the film to be pressurized across substantially the entire molten area. This affords an increased interfacial mixing of the molten web of film and thereby creates a strong heat seal. FIG. 3 illustrates an enlarged cross-sectional view of the seal area 21 of a web of film 23 sealed with the apparatus of the present invention. As illustrated, the seal is created with an angled portion 25 with little or no bead.

Referring now to FIG. 4, an embodiment of the sealing and severing apparatus 10 of the present invention is illustrated. As illustrated, the apparatus includes a sealing bar 12 located in a holder 14 on one side of a web of film 16. Located diametrically to the sealing bar 12, on a second side of the web of film 16, is a backup member 18. The backup member 18 functions to urge the web of film 16 against the sealing bar 12. As described in more detail hereinafter, briefly, the sealing bar 12 functions to melt a portion 16' of the web of film 16 so that the layers of the web of film are sealed onto themselves while contemporaneously severing the web of film. The apparatus 10 thereby assists in the creation of an individual bag having side seals.

Although not illustrated, in order to urge the sealing bar and the backup member against the web of film, jaws are provided. These jaws are known in the art and any such jaw arrangement can be utilized that causes the sealing bar 12 to contact the web of film 16. Accordingly, either the backup member 14 alone, or the backup member 14 and sealing bar 12, can be urged against the web of film 16 causing the sealing bar to seal the web of film. What is required though, is that the sealing bar 12 seal and sever the web of film 16 during the cycle time of the form, fill, seal packaging machine.

As illustrated, the sealing bar 12 includes a body portion 20. The body portion 20 includes a base 22, a first sidewall 24, and a second sidewall 26. The sealing bar 12 further includes a top portion 28 that defines means for cutting and severing the web of film 16.

In the embodiment of the apparatus 10 illustrated in FIG. 4, the top portion 28 includes a first plateau region 30 and a second plateau region 32. The first plateau region 30 and the second plateau region 32 extend parallel to an original plane of the film 16. As used herein the term "original plane of the film" references a plane created by the film as it passes through the sealing station prior to being sealed, i.e., urged against the sealing member. This plane, defined by the film as it passes through the sealing station, is illustrated in FIG. 4 in phantom lines.

Extending upwardly from the first plateau region 30 is a first side 34 and extending upwardly from the second plateau region 32 is a second side 36. The first side 34 and second side 36 extend to an apex 38 of the top portion 28 of the sealing bar 12 to define a means for severing the web of film 16. As illustrated, the first side 34 and second side 36 define, in cross-section, a substantially triangular shape. The first side 34 and second side 36 extend upwardly from each respective plateau region 30 and 32, respectively, at, with respect to a plane p that is substantially parallel to the original plane of the film, an acute included angle $\phi$. As discussed in more detail below, this construction of the top portion 28 of the sealing bar 12 allows the sealing bar to cooperate with the holder 14 to afford a means for controlling the geometric shape of the resultant side seal and thereby limit or eliminate the creation of a bead in the resultant product.

The holder 14 includes a first side 40 and a second side 42 that define a center region 44. The center region 44 is dimensioned to receive at least a portion of the body 18 of the sealing bar 12 and insulating walls 47 and 49. Accordingly, as illustrated in FIG. 4, the sealing bar 12 is securely received within the holder 14 and insulated from the sides 40 and 42 of the holder 14 by insulating walls 47 and 49. The insulating walls 47 and 49 cooperate with the holder 14 and sealing bar 12 to control the geometric shape of the side seal. Any insulating material known in the art can be utilized for constructing the insulating walls 47 and 49, although, ceramic is presently preferred and anodized aluminum has been found to function satisfactorily.

The first side 40 of the holder 14 includes a first shoulder 46 and the second side 42 of the holder includes a second shoulder 48. In the embodiment illustrated in FIG. 4, the first shoulder and second shoulder 46 and 48, respectively, extend upwardly away from the center region 44 of the holder at an acute included angle $\phi$ with respect to the plane p. Due to this construction, as set forth in detail below, when the web of film 16 is sealed and severed by the sealing bar 12, the generation of a bead in the molten area of the web of film 16 is limited.

The backup member 18 is located on a second side of the web of film 16 diametric to the sealing bar 12. The backup member 18 functions to urge the web of film 16 against the sealing bar 12 and the holder 14. To this end the backup member 18 includes an elastomeric face 50 that is resilient. The elastomic face 50 should be fairly soft. A 30 durometer high temperature silicon foam has been found to function satisfactorily.

As illustrated in FIG. 4, the elastomeric face 50 applies a pressure against the web of film 16 across substantially the entire surface defined by the top portions of the insulating walls 47 and 49 and the top portion 28 of the sealing bar 12, and a portion of the shoulders 46 and 48 of the holder 14. This construction affords an improved apparatus for sealing and severing the web of film and controlling the geometric shape and contour of the resultant seal. Due to the construction of the sealing bar 12, holder 14, and backup member 18, a good interfacial mixing of the web of material 16 in the molten area 16' is achieved. The construction of the holder 14 and sealing bar 12 results in a deflection of the bead in the molten area. The resultant seal that is created has a construction substantially similar to that illustrated in FIG. 3.

Preferably, the sealing bar 12 includes a channel that receives a cooling fluid. Preferably, the cooling fluid is water at an ambient temperature.

Preferably, the sealing bar 12 is constructed from nichrome. Although, however, the sealing bar 12 can be constructed from other materials known in the art that allow the sealing bar to heat the web of film so that it melts to itself. A sealing bar substantially similar to that set forth in U.S. Pat. Application Ser. No. 258,943, entitled: "Apparatus for Sealing a Web of Film", and filed herewith in the name of Lecon Woo et al, has been found to function satisfactorily. The disclosure of that patent application is incorporated herein by reference.

Preferably, the sealing bar is heated electrically as is known in the art. Preferably, the sealing bar is an impulse system.

Referring now to FIG. 5, another embodiment of the present invention is illustrated. In this embodiment, the holder member 114 has substantially the same construction as in the embodiment illustrated in FIG. 4. Accordingly, the holder 114 includes a first side 140 and a second side 142 having shoulders 146 and 148, respectively. The shoulders 146 and 148 extend upwardly from the center region 144 at an acute angle $\phi$ with respect to a plane p that is substantially parallel to the original plane of the film 16.

However, in this embodiment, the sealing bar 112, and specifically the top portion 128, has a somewhat different construction. In this embodiment, the body 120 of the sealing bar includes a base 122 and first and second sidewalls 124 and 126. Extending upwardly from the first sidewall 124 is a side 134 and extending upwardly from the second sidewall 126 is a side 136. The sides 134 and 136 extend upwardly from the first sidewall 124 and the second sidewall 126 respectively, at an acute angle $\phi$ with respect to a plane p.

Again, the first side 124 and second side 126 define an apex 138 for severing the web of film 16. Likewise, as in the previous embodiment, insulating walls 147 and 149 are provided between the sealing bar 112 and holder 114. As illustrated, the outer surfaces of the shoulders 146 and 148, insulating walls 147 and 149, and the sides 134 and 136 define a substantially W-shaped cross-sectional shape. This construction allows one to control the geometric shape and contour of the side seals created in the web of film and substantially limits or eliminates the formation of any bead in the side seal area.

Figure 6:
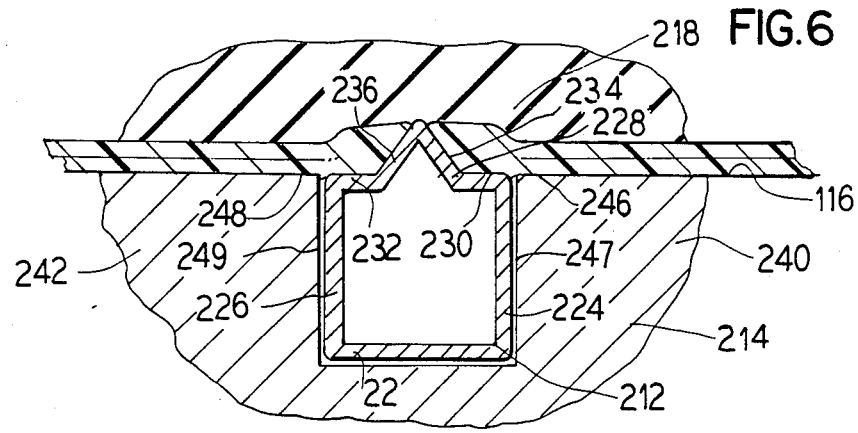
FIG. 6 illustrates a cross-sectional perspective view of another embodiment of the apparatus for sealing and severing a web of film of the present invention.

Referring to FIG. 6, another embodiment of the present invention is illustrated. In this embodiment, the sealing bar 212 has a construction substantially similar to that set forth in the embodiment illustrated in FIG. 4. However, the shoulders 246 and 248 of the holder member 214 define plateau regions 247 and 249, respectively, that lie in substantially the same plane as the plateau regions 230 and 232 of the sealing bar 212.

Figure 7:
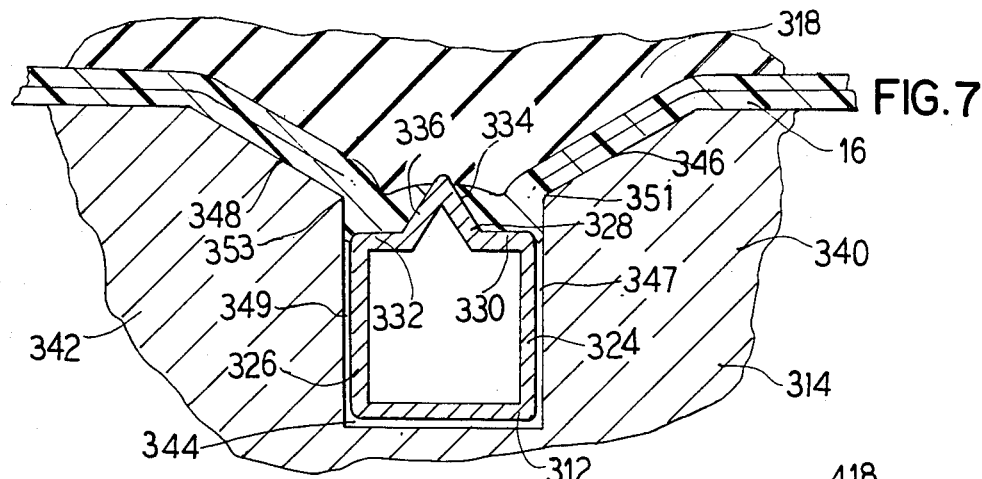
FIG. 7 illustrates a cross-sectional perspective view of another embodiment of the apparatus for sealing and severing a web of film of the present invention.

FIG. 7 illustrates another embodiment of the apparatus 310 for sealing and severing a web of film. In this embodiment, the sealing bar 312 has a construction similar to that illustrated in FIG. 4. However, the holder 314 is constructed so that when the sealing bar 312 is received within the channel 344, the shoulders 346 and 348 of the holder extend above a plane defined by the plateau regions 330 and 332 of the sealing bar 312. This construction creates a lip 351 and 353 on each shoulder 346 and 348 of the sealing bar 312.

Figure 8:
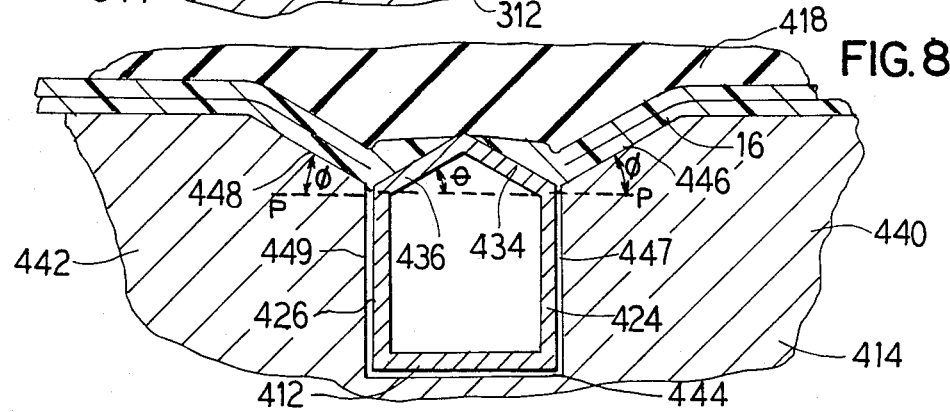
FIG. 8 illustrates a cross-sectional perspective view of another embodiment of the apparatus for sealing and severing a web of film of the present invention.

Referring now to FIG. 8, another embodiment of the present invention is illustrated. This embodiment is similar to the embodiment illustrated in FIG. 5, however, in this embodiment, the shoulders 446 and 448 of the holder 414 extend from the center region 444 at an incline having a smaller slope than the incline of the shoulders in the embodiment illustrated in FIG. 5. For example, in the embodiment illustrated in FIG. 8, angle $\phi$ is approximately 30° while the embodiment illustrated in FIG. 5, angle $\phi$ is approximately 45°. This construction affords, with respect to the cross-sectional outer surface of the holder 414, insulating walls 447 and 449, and sealing bar 412 an acute W-shape.

Referring now to FIG. 9, another embodiment of the present invention is illustrated. In this embodiment, the sidewalls 524 and 526 of the sealing bar 512 do not extend perpendicularly from the base 522. Instead, the sidewalls 524 and 526 extend from the base at angle of less than 90°.

In a similar manner, the holder 514 includes walls 581 and 583 that extend from a bottom wall 585 at an angle substantially similar to the angle the sidewalls 524 and 526 extend from the base 522. Accordingly, the holder 514 defines a channel that has a similar cross-sectional shape to a bottom portion of the sealing bar 512.

This construction affords the advantage that the sealing bar 512 is securely held by the holder 514. Depending on the thickness of the walls 522, 524, and 526, and the temperature to which the sealing bar 512 is heated, the sealing bar may have a tendency to bow outwardly. The construction of the sealing bar 512 and holder 514 illustrated in FIG. 9 ensures that the sealing bar is securely held within the holder 514 and does not bow outwardly.

As illustrated in FIG. 9, the holder 514 can be split to permit the sealing bar 512 to be easily inserted in the holder. To this end, the holder 514 can be secured together by a compression screw 591. However, is desired, the holder 514 can be one piece and the sealing bar 512 slid through the channel.

Preferably, the sidewalls 524 and 526 extend from the base 522 at an angle $\alpha$ that is approximately 45° to about 80°. Most preferably, the angle $\alpha$ is approximately 60° to about 75°. An angle $\alpha$ of 75° has been found to work satisfactorily. If the sidewalls 524 and 526 extend from the base 522 at an angle $\alpha$ of 75°, as opposed to 90°, this only increases the total surface area of the sealing bar 512 by 20% and thereby does not adversely effect the ability to cool the sealing bar 512 sufficiently quick.

Preferably, the sidewalls 581 and 583 of the holder 514 extend from the bottom wall 585 at angle $\beta$ is approximately 60° to about 75°. When angle $\alpha$ is 75° an angle $\beta$ of 75° has been found to function satisfactorily.

It should be appreciated that the embodiment of the sealing bar 512 illustrated in FIG. 9 can be utilized with the features of the other embodiments previously discussed.

In all of the presently preferred embodiments of the present invention, the side members 34, 36; 134, 136; 234, 236; 334, 336; 434, 436; and 534, 536 of the sealing bar 12, 112, 212, 312, 412, and 512 extend upwardly from a plane p that is substantially parallel to an original plane of the film at an acute angle $\phi$. Preferably, the angle $\phi$ is between approximately 10° to about 75°. Most preferably, the angle $\phi$ is equal to or greater than 30° and less than 75°.

Preferably, the angle $\phi$ with respect to the shoulders 46, 48; 146, 148; 246, 248; 346, 348; 446, 448; and 546, 548 of the holder 14, 114, 214, 314, and 414 is between approximately 0° to about 90°. In an embodiment, $\phi$ is between approximately 30° to about 50°.

In operation, the jaws housing the sealing bar/holder and backup member are closed on a web of film. During the jaw closing, the jaws are closed on the two layers of film being held taut near the center of the jaws. The elastomeric face of the backup member continues to advance until the film is urged against the sealing bar and a portion of the holder.

An electrical current pulse is then applied to the sealing bar. The electrical current applied is sufficient to raise the temperature of film above its flowing temperature. The molten film, under tension because of the backup member, is severed. Due to the pressure of the backup member, this severed film is forced to flow into a shape that conforms to the contour defined by the sealing bar and a portion of holder. Due to the symmetry of the sealing bar and holder, two identical seals are formed.

At the end of the heating pulse, and optionally following a short delay, cooling fluid such as water is introduced into the channel of the sealing bar. A very rapid cooling of the film takes place and the jaws can be opened.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim as our invention:

1. An apparatus for sealing and severing a web of film comprising:

a sealing bar having a body portion including first and second sidewalls and a top portion for melting and severing a portion of a web of film;

a backup member, located on an opposite side of the film from the sealing bar and diametric thereto, for urging the film against a portion of the sealing bar; and a holder for holding the sealing bar, the holder including a first side and a second side that define a center region for receiving at least a portion of the body of the sealing bar, the first and second sides each including shoulders, the shoulders and top portion of the sealing bar being so constructed and arranged to define means for deflecting a bead generated at a molten area of the film when the film is sealed and severed and for substantially limiting the creation of a resultant bead in a final cooled product.

2. The apparatus of claim 1 wherein at least a portion of the top portion of the sealing bar has a substantially triangular cross-sectional shape.

3. The apparatus of claim 1 wherein outer surfaces of the shoulders and of the top portion of the sealing bar define, in cross-section, a W-shape.

4. The apparatus of claim 1 wherein the top portion of the sealing bar includes a first and second sides that extend upwardly at an acute included angle $\phi$ with respect to a plane that is substantially parallel to a plane defined by the web of film before it is sealed and define at an apex of the top portion cutting means for severing the film.

5. The apparatus of claim 4 wherein the top portion further includes plateau regions located between each side and sidewall and extending substantially parallel to the plane defined by the film before it is sealed.

6. The apparatus of claim 4 wherein the shoulders of the holder extend upwardly from the center at an acute included angle $\phi$ with respect to the plane that is substantially parallel to a plane defined by the film before it is sealed.

7. The apparatus of claim 5 wherein the shoulders of the holder extend upwardly from the center of the holder at an acute included angle $\phi$ with respect to the plane that is substantially parallel to a plane defined by the film before it is sealed.

8. The apparatus of claim 5 wherein the shoulders define plateau regions lying in a plane substantially equal to a plane defined by the plateau regions of the sealing bar.

9. The apparatus of claim 4 wherein the angle $\phi$ is greater than 30° and less than 75°.

10. The apparatus of claim 6 wherein the angle $\phi$ is greater than or equal to approximately 30° and less than 50°.

11. The apparatus of claim 7 wherein the angle $\phi$ is greater than or equal to approximately 30° and less than 50°.

12. The apparatus of claim 1 including insulating walls located in the center region insulating the holder from the sealing bar.

13. The apparatus of claim 4 wherein the apex of the sealing bar extends to a plane that is substantially at the same height as a plane extending across the top portions of the shoulders of the holder.

14. The apparatus of claim 4 wherein the apex of the sealing bar extends to a plane that is above a plane defined by the top portions of the shoulders of the holder.

15. The apparatus of claim 4 wherein the apex of the sealing bar extends to a plane that is below a plane defined by the top portions of the shoulders of the holder.

16. The apparatus of claim 15 wherein the shoulders each include a lip.

17. The apparatus of claim 1 wherein the sidewalls of the sealing bar extend from a bottom of the sealing bar at an angle $\alpha$ that is less than 90°.

18. The apparatus of claim 17 wherein $\alpha$ is approximately 45° to about 80°.

19. The apparatus of claim 17 wherein the holder includes sidewalls that extend from a bottom wall of a channel defined by the holder at an angle $\beta$ that is approximately the same as angle $\alpha$.

20. The apparatus of claim 19 wherein $\beta$ is approximately 45° to about 80°.

21. An apparatus for sealing and severing a web of film comprising:

a sealing bar having a body portion including first and second sidewalls and a top portion for melting and severing a portion of the web of film, the top portion including first and second sides extending upwardly from the first and second sidewalls at an acute included angle $\phi$ with respect to a plane that is parallel to a plane defined by the web of film as it is fed to the apparatus for sealing and severing;

a holder for holding the sealing bar, the holder including a first side and a second side that define a center region for receiving the body of the sealing bar, the first and second sides each including shoulders;

insulating walls located in the center region for insulating the sealing bar from the holder;

the shoulders, top portion of the insulating walls, and top portion of the sealing bar defining means for substantially limiting the creation of a resultant bead in the film during the sealing and severing process; and a backup member, located on an opposite side of the film from the sealing bar and diametric thereto, for urging the film against a portion of the sealing bar, insulating walls, and shoulders.

22. The apparatus of claim 21 wherein the outer surfaces of the shoulders of the holder member, insulating walls, and top portion of the sealing bar define, in cross-section, a W-shape.

23. The apparatus of claim 21 wherein the top portion further includes plateau regions located between each side and sidewall and extending substantially in a plane substantially parallel to the plane defined by the web of film as it is fed to the apparatus for sealing and severing.

24. The apparatus of claim 21 wherein the shoulders of the holder extend upwardly from the center of the holder at an acute included angle $\phi$ with respect to the plane defined by the web of film.

25. The apparatus of claim 23 wherein the shoulders of the holder extend upwardly from the center of the holder at an acute included angle $\phi$ with respect to the plane defined by the web of film.

26. The apparatus of claim 23 wherein the shoulders define plateau regions lying in a plane substantially equal to a plane defined by the plateau regions of the sealing bar.

27. The apparatus of claim 21 wherein the angle $\theta$ is greater than 30° and less than 75°.

28. The apparatus of claim 21 wherein the apex of the sealing bar extends to a plane equal to the height of a plane extending across the top portions of the shoulders of the holder.

29. The apparatus of claim 21 wherein the apex of the sealing bar extends to a plane that is above a plane defined by the top portions of the shoulders of the holder.

30. The apparatus of claim 21 wherein the apex of the sealing bar extends to a plane that is below a plane defined by the top portions of the shoulders of the holder.

31. The apparatus of claim 21 wherein the backup member has an elastomer face.

32. The apparatus of claim 21 wherein the insulating walls are constructed from a material chosen from the group consisting of ceramic and anodized aluminum.

33. The apparatus of claim 21 wherein the sidewalls of the sealing bar extend from a bottom wall of the sealing bar at an angle $\alpha$ that is less than 90°.

34. The apparatus of claim 33 wherein $\alpha$ is approximately 45° to about 80°.

35. The apparatus of claim 33 wherein the holder includes sidewalls that define the center region, the sidewalls extending from a floor of the center region at an angle $\beta$ that is approximately equal to angle $\alpha$.

36. The apparatus for claim 35 wherein angle $\beta$ is approximately 45° to about 80°.

37. An apparatus for sealing and severing a web of film comprising;
   a sealing bar having a body portion including first and second sidewalls and a top portion for melting and severing a portion of a web of film, the top portion including first and second sides extending upwardly from the first and second sidewalls at an angle $\theta$ of approximately 30° to about 75° with respect to a plane that is substantially parallel to a plane defined by the web of film as it is fed to the apparatus for sealing and severing;
   a holder for holding the sealing bar, the holder including a first side and a second side having first and second sidewalls that define a center region for receiving the body of the sealing bar, the holder including insulating walls for insulating the sealing bar from the holder, the first and second sides of the holder each including a shoulder extending from the center region at an angle of approximately 0° to about 90° with respect to the plane substantially parallel to the plane defined by the web of film; and
   a backup member, located on an opposite side of the film from the sealing bar and including means for exerting a pressure against a web of film to be sealed and severed over substantially the entire face of the sealing bar and insulating walls and a portion of the shoulders.

38. The apparatus of claim 37 wherein the top portion further includes plateau regions located between each side and sidewall, extending substantially parallel to the plane defined by the web of film.

39. The apparatus of claim 37 wherein the shoulders define plateau regions lying in a plane substantially equal to a plane defined by the plateau regions of the sealing bar.

40. The apparatus of claim 37 wherein the sides define an apex of the sealing bar that extends to a plane equal to the height of a plane extending across the top portions of the shoulders of the holder.

41. The apparatus of claim 37 wherein the sides define an apex of the sealing bar that extends to a plane that is above a plane defined by the top portions of the shoulders of the holder.

42. The apparatus of claim 37 wherein the sides define an apex of the sealing bar that extends to a plane that is below a plane defined by the top portions of the shoulders of the holder.

43. The apparatus of claim 37 wherein the sidewalls of the sealing bar extend from a bottom wall at an angle $\alpha$ that is less than 90°.

44. The apparatus of claim 43 wherein $\alpha$ is approximately 60° to about 75°.

45. The apparatus of claim 43 wherein the sidewalls of the holder extend from a floor of the center region at an angle $\beta$ that is approximately equal to an angle $\alpha$.

46. The apparatus of claim 45 wherein $\beta$ is approximately 60° to about 75°.

* * * * *

UNITED STATES PATENT AND TRADEMARK OFFICE
CERTIFICATE OF CORRECTION

PATENT NO. : 4,856,259

DATED : August 15, 1989

INVENTOR(S) : Lecon Woo, Michael T. Ling

It is certified that error appears in the above-identified patent and that said Letters Patent is hereby corrected as shown below:

In column 6, at line 65, delete "∅" and substitute --θ-- therefor.

In column 8, at line 21, delete "∅" and substitute --θ-- therefor.

In column 8, at line 22, delete "∅" and substitute --θ-- therefor.

In column 8, at line 23, delete "∅" and substitute --θ-- therefor.

In column 9, at line 22, delete "∅" and substitute --θ-- therefor.

In column 9, at line 45, delete "∅" and substitute --θ-- therefor.

In column 10, at line 19, delete "∅" and substitute --θ-- therefor.

Signed and Sealed this

Fourteenth Day of August, 1990

Attest:

HARRY F. MANBECK, JR.

*Attesting Officer*  *Commissioner of Patents and Trademarks*